United States Patent [19]

West et al.

[11] Patent Number: 5,714,747
[45] Date of Patent: *Feb. 3, 1998

[54] MAGNETIC CARD AND READER SYSTEM

[75] Inventors: Bradford Drake West, La Jolla; Greg A. Burg, San Diego; Steven James Adamson, Poway; Frederick Rockwell Chamberlain, IV, Vista; Tomasz Mark Jagielinski, Carlsbad; Frederick John Jeffers, Escondido, all of Calif.; Robert Owen James, Rochester, N.Y.; Neil Smith, San Diego, Calif.

[73] Assignee: Eastman Kodak Company, Rochester, N.Y.

[*] Notice: The term of this patent shall not extend beyond the expiration date of Pat. No. 5,698,839.

[21] Appl. No.: 682,176

[22] Filed: Jul. 17, 1996

[51] Int. Cl.[6] .................... G06K 7/08; G06K 19/06
[52] U.S. Cl. ............................ 235/493; 235/449
[58] Field of Search ........................... 235/449, 493

[56] References Cited

U.S. PATENT DOCUMENTS

| | | | |
|---|---|---|---|
| 4,114,032 | 9/1978 | Brosow et al. | 235/493 |
| 5,434,917 | 7/1995 | Naccache et al. | 235/449 |
| 5,473,147 | 12/1995 | Hoshino et al. | 235/449 |

Primary Examiner—Donald T. Hajec
Assistant Examiner—Douglas X. Rodriguez
Attorney, Agent, or Firm—William F. Noval

[57] ABSTRACT

A credit and access control card and reader system comprising: a magnetically encodable card comprising a body having upper and lower surfaces and side and end edges, the body being formed of plastic material having magnetic particles uniformly dispersed throughout the plastic material; and a reader having a magneto resistive (MR) head for reading the magnetically encodable card as it is moved past the MR head.

5 Claims, 9 Drawing Sheets

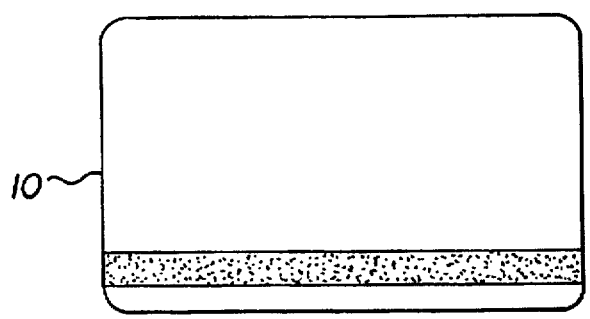
FIG. 1a  FIG. 1b
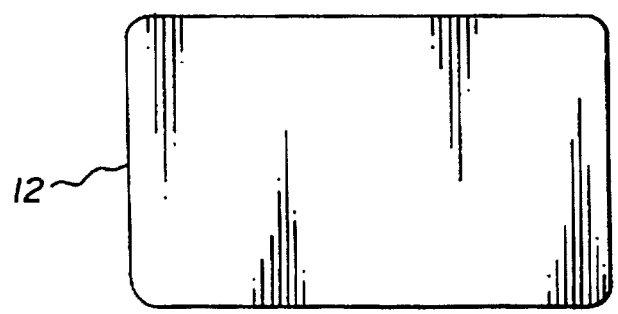
FIG. 1c  FIG. 1d

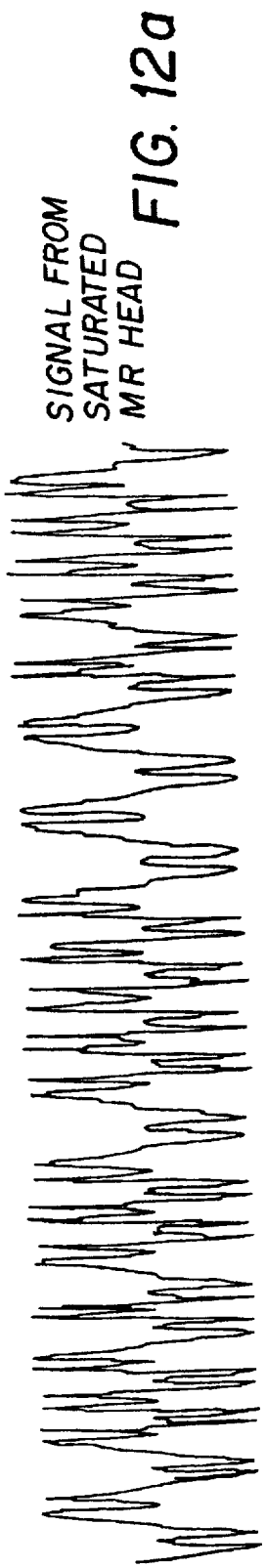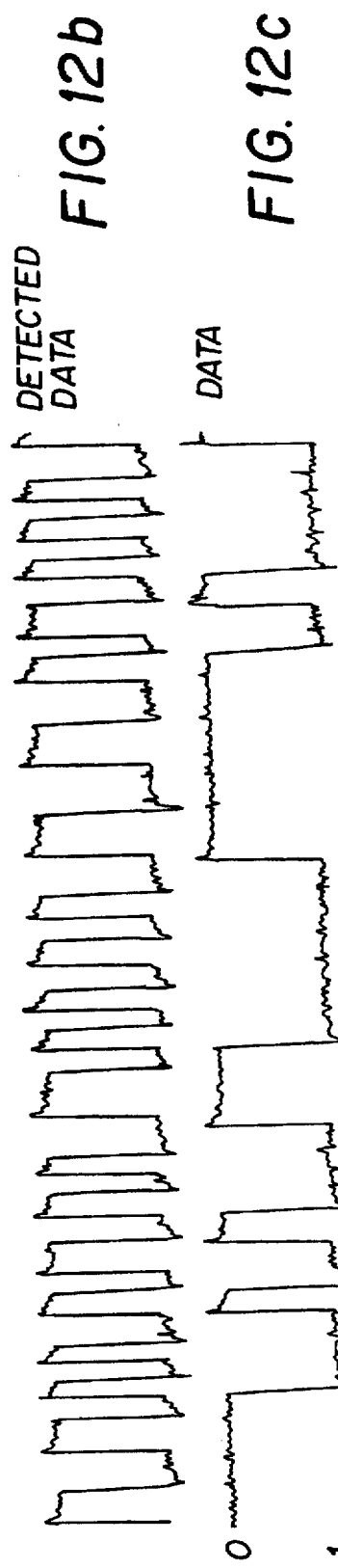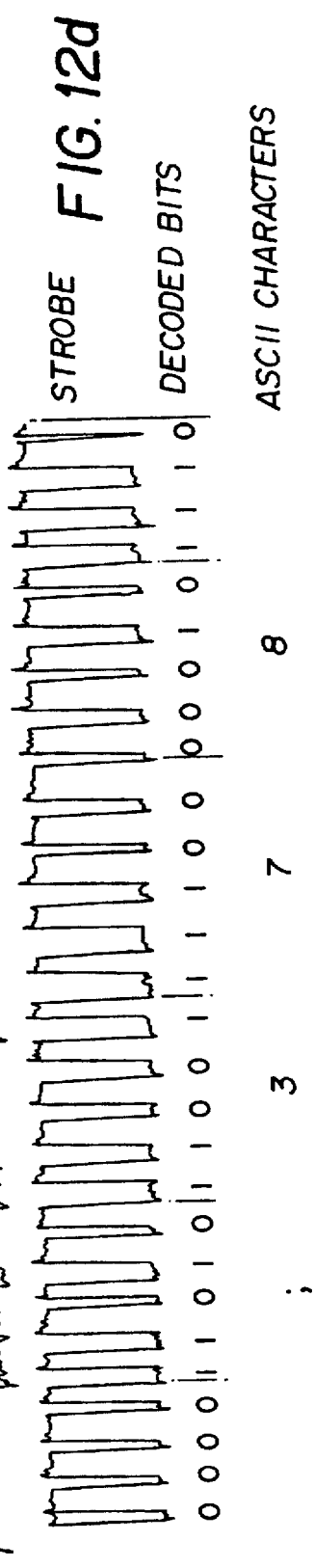
FIG. 12a SIGNAL FROM SATURATED MR HEAD
FIG. 12b DETECTED DATA
FIG. 12c DATA
FIG. 12d STROBE
DECODED BITS
ASCII CHARACTERS

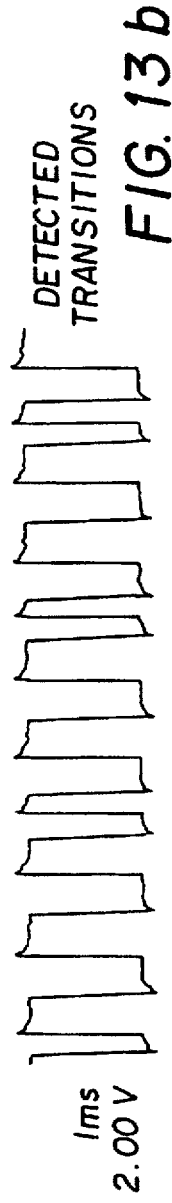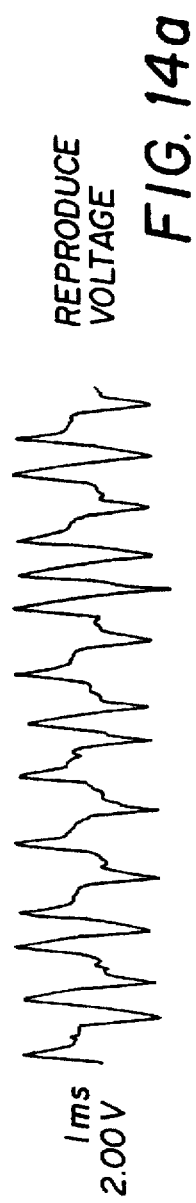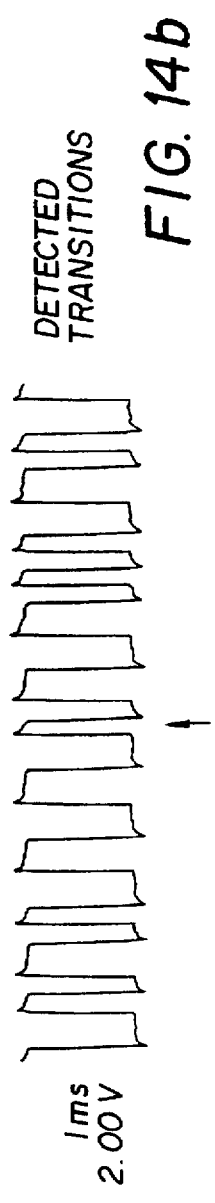

MAGNETIC CARD AND READER SYSTEM

CROSS REFERENCE TO RELATED APPLICATIONS

This application claims the benefit under 35 USC 120 of the filing dates of the following copending U.S. applications:

U.S. patent application Ser. No. 08/444,488, filed 19 May 1995, entitled "Saturated Mode MR Head", inventors Gregory A. Burg and Frederick Chamberlain;

U.S. patent application Ser. No. 08/418,336, filed 07 Apr. 1995, entitled "Magnetically Encodable Card Having Magnetic Pigment Uniformly Dispersed in Plastic", inventors Tomasz Jagielinski, Frederick Jeffers, and Robert James;

U.S. patent application Ser. No. 08/444,487, filed 19 May 1995, entitled "Preamp Circuit for PMR Head", inventor Gregory Burg; and U.S. patent application Ser. No. 08/564,751, filed 29 Nov. 1995, entitled "Flux-Guided Paired Magnetoresistive Head", inventor Neil Smith.

FIELD OF INVENTION

This invention relates in general to credit and access control card systems and more particularly to a new and improved credit and access control card system.

BACKGROUND OF THE INVENTION

Current credit card and access control card systems rely on inductive heads to read a magnetic stripe that has been affixed to the back of a PVC (polyvinylchloride) card. The magnetic stripe is made in a similar fashion to magnetic tape. That is, it is loaded with magnetic oxides to a level of about 40% by volume. This high loading is required to give adequate signal to be picked up by the inductive head in the card reader. These systems have been in use for over twenty years. However, there are problems with these systems. The cards have a limited life and they can be easily duplicated, or erased. The PVC in the cards is a carcinogenic material posing a health hazard for the manufacture and disposal of spent cards. As the number of cards in use increases, these hazards become more of a problem.

SUMMARY OF THE INVENTION

According to the present invention, there is provided a new credit and access control card and reader system that is designed to solve many of the problems facing the card industry. The system is composed of a new card reader that uses a magneto-resistive head along with new electronics to decode the signals coming from the head. The electronics are designed in such a manner as to allow decoding of both the new cards described herein, as well as conventional magnetic striped cards. This gives the system backward compatibility with existing cards. The system also includes a new card made in such a manner that requires no magnetic stripe. The data can be encoded in the conventional manner anywhere on the card since the entire card volume contains magnetic particles and can therefore be used to store digital data. The concentration of magnetic particles is low enough that the card can still be made white by the addition of $TiO_2$ to the base card material. These cards can only be decoded using the new MR type card readers. In addition, the magnetic particles are of the "high coercivity" type making accidental erasure much more difficult.

According to a feature of the present invention, there is provided a credit and access control card and reader system comprising:

a magnetically encodable card comprising a body having upper and lower surfaces and side and end edges, said body being formed of plastic material having magnetic particles uniformly dispersed throughout the plastic material; and a reader having a magnetoresistive (MR) head for reading said magnetically encodable card as it is moved past said MR head.

ADVANTAGEOUS EFFECT OF THE INVENTION

The system described provides a secure credit or access control card system. Because the card is made with high coercivity media, and the concentration of the media is so low, the cards cannot be easily erased, and they cannot be contact duplicated. In addition, they will not overwrite adjacent cards as can happen with "hi-co" standard magstripe cards. The cards life is greatly extended because, unlike standard cards, there is no thin magnetic stripe to wear off the card. The entire card volume would have to be removed before the card is rendered useless. Since data can be written anywhere on the card, it has the potential to store a great deal more data than a standard card. The card may also be written with the same data in all possible directions on the card (as shown in FIG. 15) such that the card may be swiped through the card reader in any direction without concern for card orientation. Not having to have a magstripe on the card frees that area for printing additional visual information, and reduces the manufacturing costs of the card since no stripe need be applied. Additionally, the card can be made from materials that are non-carcinogenic (PETG).

The new FGPMR card reader has the advantage of being able to read both the new cards as well as standard magstriped cards. This is important to provide backward compatibility with existing cards. We have taken advantage of the tremendous sensitivity of the FGPMR head which, when combined with the electronics herein, gives the reader a dynamic range of over 250x. An added benefit of the FGPMR head is that it's signal output is speed independent. MR heads are true magnetic field detectors. Conventional inductive heads sense the change in field and thus the card velocity must be of adequate speed for the head to operate. The FGPMR will sense the data on the card over a much broader range of speeds than will a standard inductive head.

The combination of the low concentration magnetics card and the new FGPMR reader means that the card is secure, only readable by these special readers, and the card life is extended while decreasing it's manufacturing costs.

BRIEF DESCRIPTION OF THE DRAWINGS

FIG. 1a–1d are plan and side views of a standard card and new cards require no magnetic stripe.

FIG. 12a–12d is a graphical view of the decoding signal from FGPMR head reading standard mag-stripe card.

FIG. 13a–13b is a graphical view of the output reading high concentration card.

FIG. 14a–14b is a graphical view of the output reading low concentration card.

DETAILED DESCRIPTION OF THE INVENTION

Figure 2:
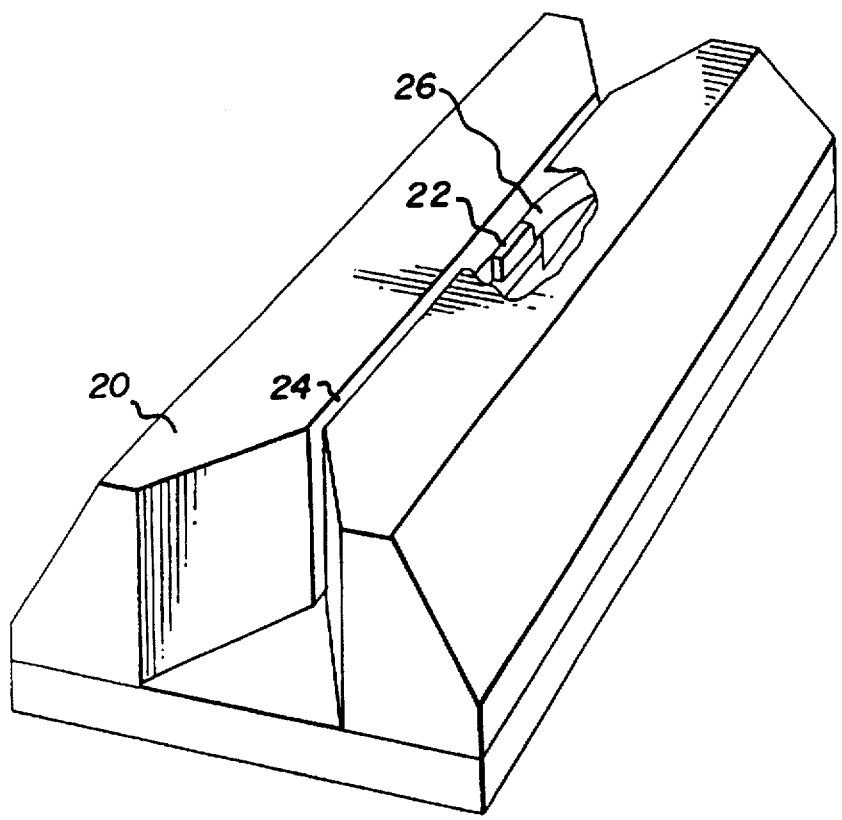
FIG. 2 is a diagrammatic, perspective view of a card reader showing head mounting.

The card and reader system, according to the invention, is comprised of two major parts, the cards 10 and 12 (FIG. 1) and the reader 20 (FIG. 2). The reader 20 is made from several components, the heads 22, electronics (described later), hardware to hold both the heads 22 and the electronics, the slot 24 through which the card 10,12 passes, and the head mounting hardware 26 which presses the head against the card. Reader 20 includes a magnetoresistive (MR) head 22 and electronics designed to decode the signals from the MR head 22 for both the new cards as well as standard magnetic striped cards.

Figure 3:
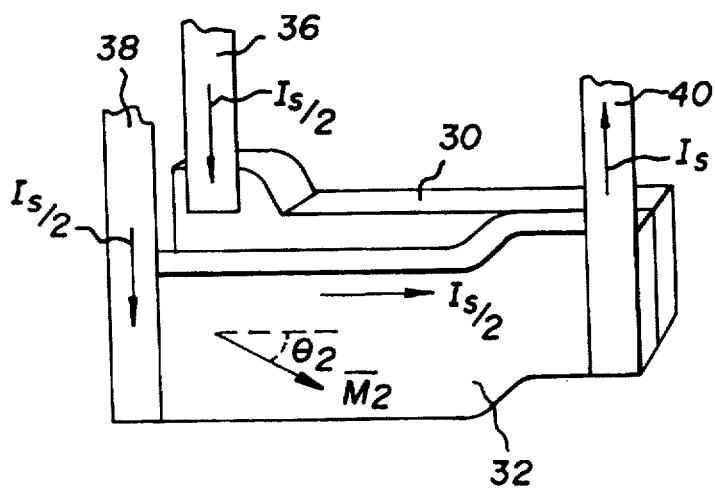
FIGS. 3 and 4 are diagrammatic views of a paired MR head.
Figure 4:
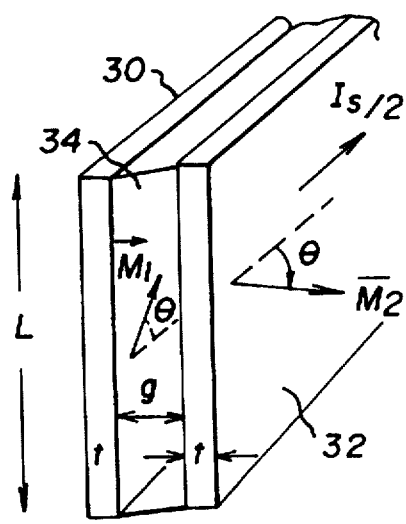

The MR head used in this system is preferably of the type described in copending U.S. application Ser. No. 08/564,751, filed 29 Nov. 1995, entitled "Flux-Guided Paired Magnetoresistive Reproduce Head", inventor Neil Smith, which is hereby incorporated by reference. The use of paired magnetoresistive (MR) reproduce heads has been shown in U.S. Pat. No. 3,860,965. The head 22 consists of a matched pair of NiFe MR elements 30,32 (FIG. 3) side-by side separated by a thin insulating gap material 34 as shown in FIG. 4. One end of each MR element 30,32 may be electrically shorted to the other element forming a three terminal 36,38,40 device with one terminal 40 common to both MR elements 30,32. For this paired MR (PMR) sensor head 22, the sense currents in the two elements 30,32 flow in parallel. If the voltage at the two unconnected terminals 36,38 of the PMR 22 is sensed differentially, the individual voltages changes due to the signal field will add together. However, the changes due to fluctuations in the temperature of the two MR elements 30,32 will be canceled out by the differential detection. Such temperature fluctuations can be large for in contact applications such as in a card reader 20.

Figure 5:
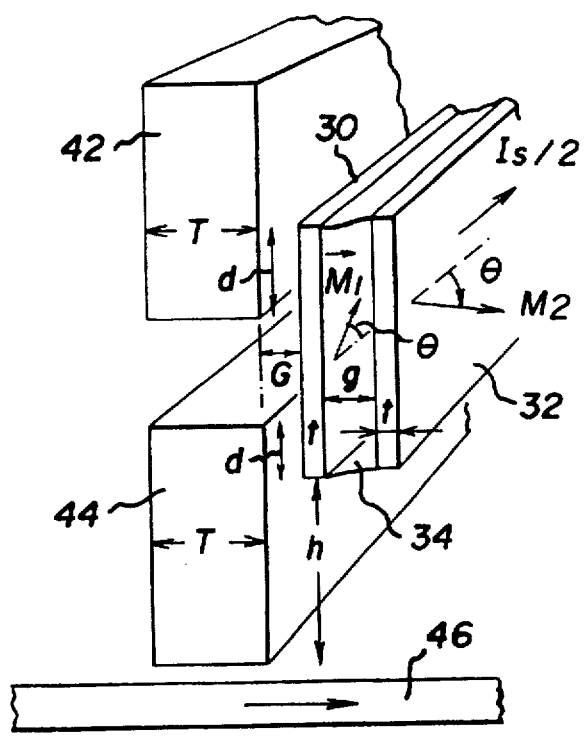
FIGS. 5 and 6 are diagrammatic views of a flux guided paired MR head.
Figure 6:
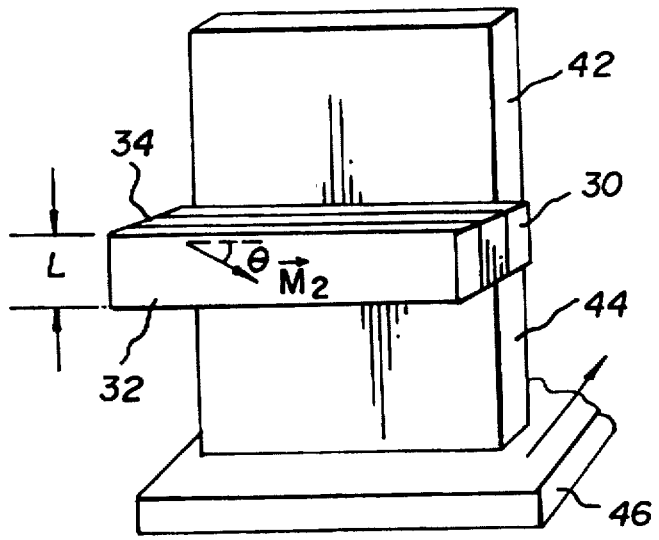
Figure 7:
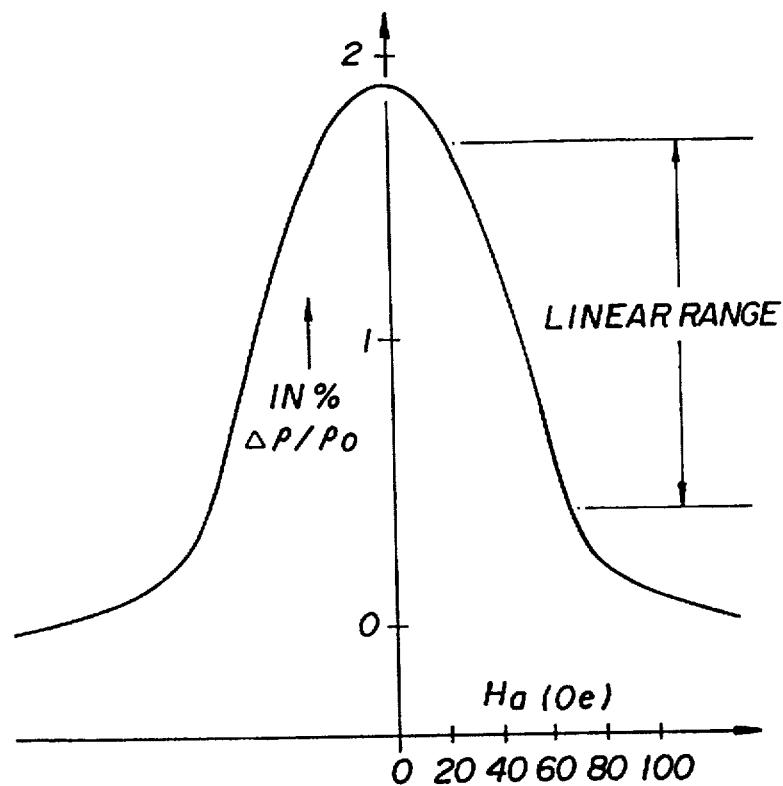
FIG. 7 is a graphical view of uniform field transfer function for MR head.

For the PMR head 22 to function it is necessary that the two MR elements 30,32 remain electrically insulated from one another everywhere along their trackwidth. For in-contact recording applications rubbing of the PMR head 20 against the media 46 may result in smearing of the relatively soft NiFe across the insulating gap 34 resulting in shorted elements 30,32. Other factors from the environment may short out the elements 30,32 as well. Therefore, the head 20 can be recessed from exposure to the media 46 by the introduction of flux guides 42,44 as shown in FIGS. 5 and 6. In this configuration the PMR 22 is never exposed to the environment while the flux guides 42,44 act to direct the magnetic field to the PMR 22. This configuration will not significantly disturb the magnetization distribution of the flux-guided PMR 22 (FGPMR) provided that G>g and that $d<(B_sGt/4H_k)^{1/2}$ (where $B_s$=saturation flux density of the MR and $H_k$ the induced uniaxial anisotropy field). However, having $d>(B_sGt/4H_k)^{1/2}$ insures good flux coupling between the flux guides and the PMR. Therefore, we should have G>g and $d\approx(B_sGt/4H_k)^{1/2}$. It is also best to restrict the overlap distance d such that $d/L \leq \frac{1}{4}$ in order to avoid excessive flux shunting of the PMR 22 by the flux guides 42,44. Also, the total magnetic thickness of the flux guides should be chosen such that T=λmin/2, where λmin is the minimum recorded wavelength that will be read.

The FGPMR head 22 is mounted in a card reader 20 as shown in FIG. 2. This configuration allows the head 22 to be placed into intimate contact with the card 10,12 as the card 10,12 is swiped through the reader 20. The reader 20 may also be of the motorized type which does not require the user to swipe the card 10,12 through the reader 20. The reader 20 provides a slot 24 through which the card 10,12 is passed. The head 22 is pressed against the card by the spring mount fixture 20. Achieving good contact between the card 10,12 and the FGPMR head 22 is important for signal recovery.

Inside the reader housing the FGPMR head 22 is wired to an electronic circuit that will decode the signals from the head 22 and convert those signals to digital information. The electronics required for this system are described in greater detail in U.S. patent application Ser. No. 08/444,488, filed 19 May 1995, entitled "Saturated Mode MR Head", inventors G. Burg and F. Chamberlain, and U.S. patent application Ser. No. 08/444,487, filed 19 May 1995, entitled "Preamp Circuit for PMR Head", inventor Greg Burg, which are hereby incorporated by reference.

In order to read both the new cards 10 with standard magnetic stripes, special circuitry to be described is required. The magnetic field levels arising from standard cards 10 are approximately 250 times larger than from the new cards 12. This large difference in signal levels makes development of a reader 20 suitable for both types difficult. This difficulty is handled within the electronics. In the case of the new cards 12 the signal levels are low, requiring a reproduce head 22 with great sensitivity. Conversely, the signals from the standard magnetic striped card 10 are very large, requiring a head 22 with a very large dynamic range. In order to achieve both these requirements with a single head 22, the FGPMR head 22 is allowed to operate in a saturated mode when reading a standard mag-stripe card 10 while operating in a normal manner when reading the new cards 12.

Figure 8:
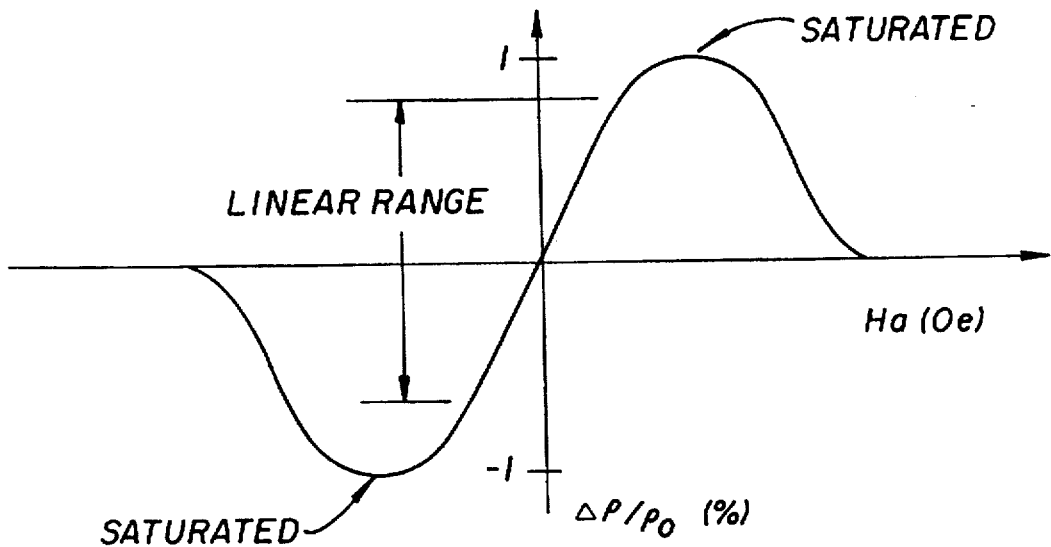
FIG. 8 is a graphical view of uniform field transfer function for paired MR head.

A magnetoresistive head is generally designed to read from a single type of media. When operated in the normal manner, the output is linear. This is also true for a paired MR as shown in FIG. 8 which gives the uniform field transfer function for a PMR head. Operating with a medium of higher magnetic signal strength than which the head was designed results in non-linear response and signal distortion. If the field is large enough, the MR sensor saturates. Saturation is reached when further increase in magnetic fields results in no further increase of signal output which is indicated in figure eight. In this case, the field strength from a standard magnetic strip card is large enough to saturate the FGPMR read head.

Figure 9:
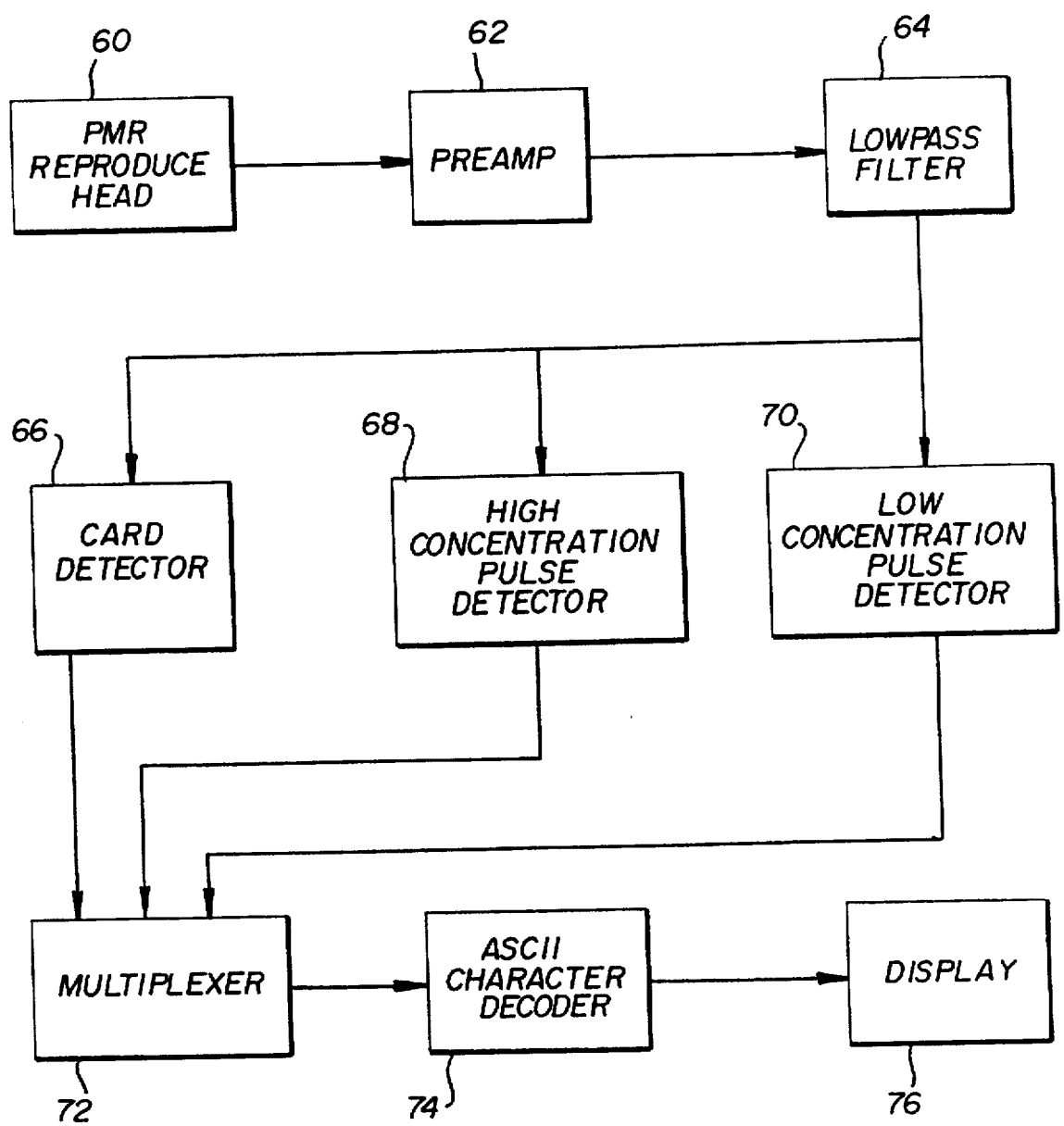
FIG. 9 is a block diagram of high and low concentration credit card reproduce electronics.
Figure 10:
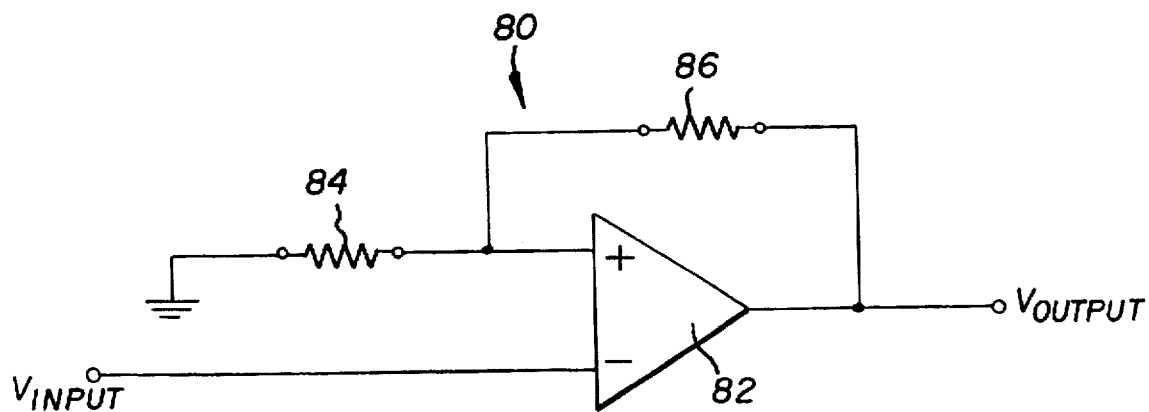
FIG. 10 is a circuit diagram of hysteresis comparator.
Figure 11:
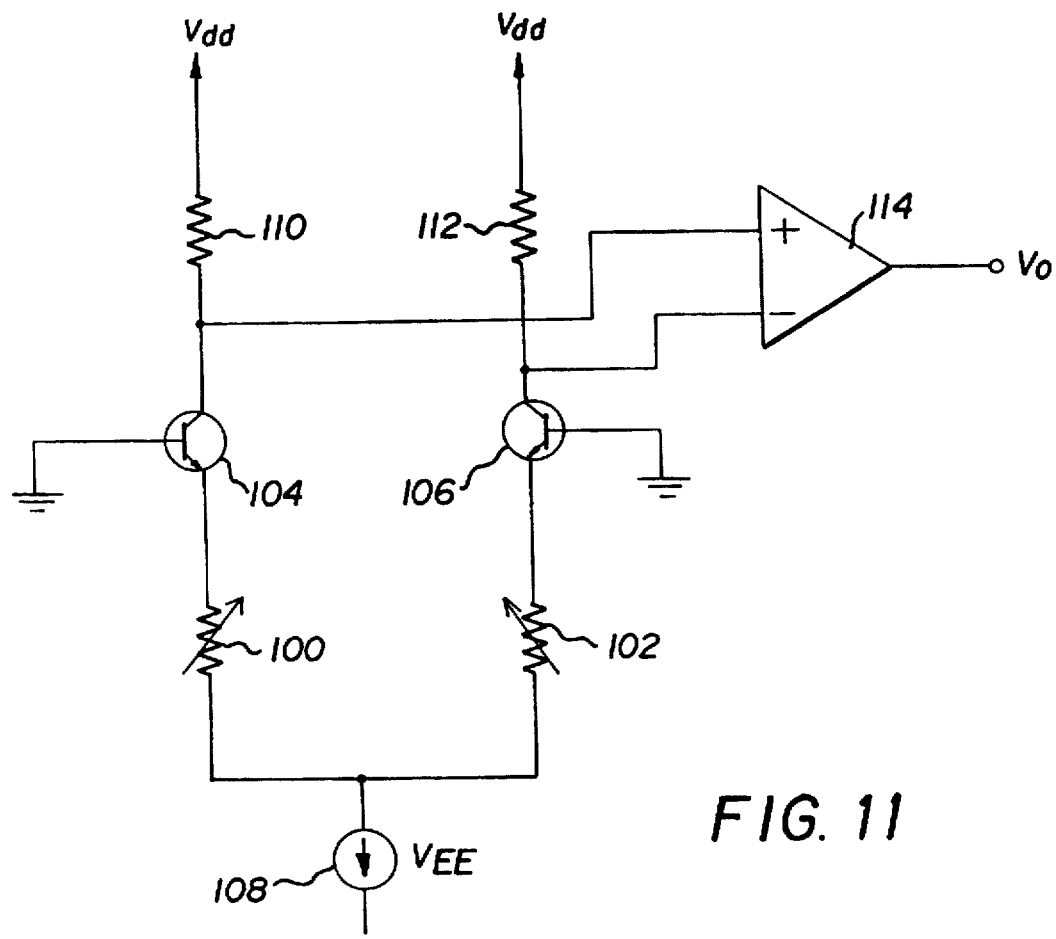
FIG. 11 is a schematic diagram of a preamp circuit.
Figure 15B:
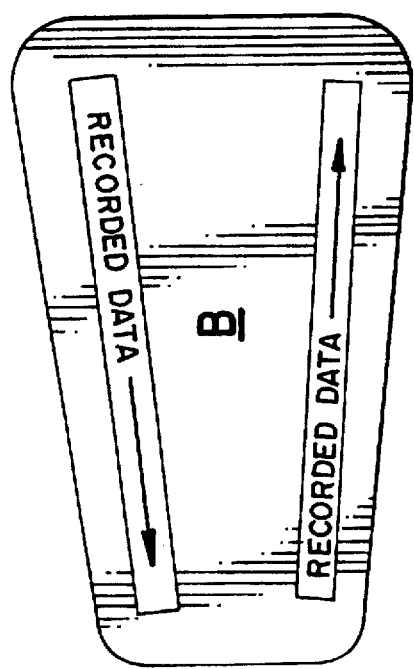
FIG. 15a–15b are diagrammatic views of the new card showing location of encoded data for easy card swiping.
Figure 15A:
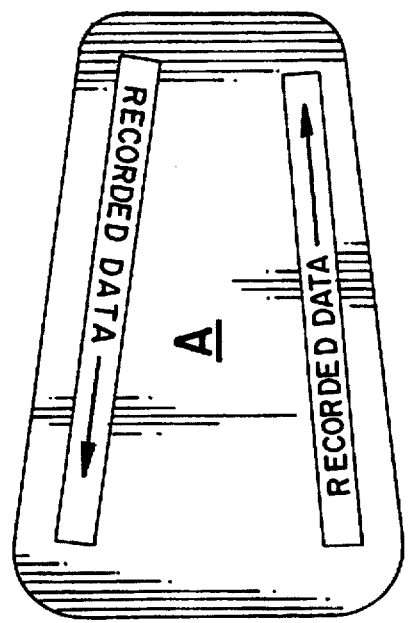

This problem can be solved by use of the circuits shown in FIGS. 9, 10, and 11, and which are described in greater detail in the above-referenced U.S. patent application Ser. No. 08/444,487 and 08/444,488. FIG. 9 is a block diagram of the circuits. As shown a FGPMR reproduce head 60 produces a signal which is amplified in the preamp 62 and filtered by the lowpass filter 64. The FGPMR head 60 is capable of reading both new cards 12 as well as standard magstripe cards 10. The signal from the lowpass filter 64 is supplied to the card detector 66, high concentration pulse detector 68 and low concentration pulse detector 70. The card detector 66 consists of two comparators (one threshold is set for the high concentration card and the other is set for the new low concentration card). If a high concentration card is swiped through the reader, the amplitude of the signal will be greater than the threshold set for the high concentration card. This switches the multiplexer 72 to connect the signals from the high concentration pulse detector 68 to the ASCII character decoder 74. On the contrary, if a low concentration card is swiped through the reader, the amplitude of the signal will be greater than the threshold for the low concentration card, but less than the threshold for the high concentration card. This switches the multiplexer 72 to connect signals from the low concentration pulse detector 70 to the ASCII character decoder 74. The output of the decoder 74 is sent to the host or to the display 76.

Card detector 66 (FIG. 9) will now be described in greater detail. When the high concentration card (a standard magstriped card) 10 is swiped through the reader, the voltage output is processed by a hysteretic comparator circuit 80 shown in FIG. 10. As shown, circuit 80 includes operational amplifier 82 and resistors 84,86. Starting with the output state low, this circuit 80 holds the V output low until the V input drops below the lower threshold voltage determined by the resistors 84,86 and the value of the output voltage. The output of the hysteretic comparator circuit 80 remains low until the amplitude of the V input exceeds the upper threshold. At this point, the output of the hysteretic comparator circuit 80 switches high.

FIG. 12 shows data from a working prototype of the card reader system reading a standard magnetic striped card 10 (FIG. 1). The top curve shows the signal of a FGPMR head when reading the standard magnetic stripe. Saturation is evident from the fact that the signal for each magnetic transition has two peaks. The double peak is caused by applying a field which is large enough to cause the differential change in resistance to go back to zero. The second curve in FIG. 12 shows the output of the comparator circuit. The comparator allows the second peak caused by head saturation to be ignored. The third and fourth curves and string of characters demonstrate the use of the comparator output to decode the magnetically stored information. FIGS. 13 and 14, respectively, show the reproduce voltage and detected transitions from a standard high concentration mag-stripe card 10 and a new low concentration card 12.

Referring to FIG. 11, there is shown a schematic diagram of a preferred preamplifier circuit 62 (FIG. 9) for a FGPMR reproduce head. A pair of magnetoresistive element 100,102 are connected between the emitters of the transistors 104, 106 and a current source 108 which is connected to a voltage $V_{EE}$. The bases of the transistors are electrically connected to a common voltage (ground). The collectors of the transistors are respectively connected to a voltage source $V_{dd}$ by means of the resistors 110,112. The voltages at the collectors of the transistors are differentially amplified by the amplifier 114 and the signal output is $V_o$. The common base differential preamp 62 serves the following three purposes for the FGPMR head: 1) provides enough current for each element of the head, 2) signal amplification, and 3) common-mode rejection.

The new card 12 in the system of the invention can be magnetically encoded anywhere on it's entire surface. This is true because the entire volume of the card contains magnetic particles as described in copending U.S. patent application Ser. No. 08/418,336, filed 07 Apr. 1995, entitled "Magnetically Encodable Card Having Magnetic Pigment Uniformly Dispersed in Plastic", inventors T. Jagielinski et al., which is incorporated herein by reference. This card is formed from a solid plastic material having magnetic particles uniformly dispersed throughout the volume of the card. Magnetic particles may be of a high coercivity material such as barium ferrite or strontium ferrite, of a medium coercivity, such as is used in magnetic stripes of conventional ID cards or a very soft low coercivity material.

It is preferred that the concentration of magnetic particles in the card be in a range from substantially 0.001 percent by volume to substantially 0.05 percent by volume, and most preferably in a range from substantially 0.008 percent to substantially 0.03 percent by volume. These percentages are supported by the examples of the invention disclosed in U.S. patent application Ser. No. 08/418,731, filed 07 Apr. 1995, entitled "Method of Making a Magnetically Encodable Card Having Magnetic Particles Uniformly Distributed Throughout", inventors Robert O. James et al. These concentrations of particles are preferable because they do not color the card substantially. This allows the card to remain white when $TiO_2$ is added as a whitening agent. The low concentration of magnetic particles also gives low remnant fields which prevents the card from being anhysteretic duplicated. An added benefit of the low concentration and thus low remanent fields is that the card will not overwrite a card when placed in contact with a low coercivity card such a may happen when a person puts two credit cards in a wallet or purse. The use of high coercivity particles in the card prevents accidental erasure, the number one cause for card failure. When standard mag stripe cards are made with such high coercivity particles they can be easily contact duplicated or they may overwrite adjacent cards. This new low concentration cards has the benefits of high coercivity media with none of the drawbacks.

The card 12 is preferably made by the following process which is disclosed in great detail in the latter U.S. patent application Ser. No. 08/418,731. The method of making the cards includes forming a dispersion of ferromagnetic particles in an organic fluid medium, intimately combining the dispersion with a thermoplastic resin, the resin being plasticized by the organic fluid medium to form a composite. The composite is then preferably fabricated into the standard credit card shape as described in ANSI Specification X.413—1983, entitled "American National Standard for Financial Services - Financial Transaction Cards", or to whatever shape is desired. Another additives, such as whiteners, colored dyes, antioxidants, antistatic agents, lubricants, abrasives and thermally responsive materials may be added to the plastic to provide the desired mechanical properties.

Englehard et al. (U.S. Pat. No 3,308,010) teaches making a magnetizable card by building a card up from three layers. A base layer of mylar with no magnetic particles, then a layer of polyethylene containing high concentrations of magnetic particles (35%) followed by a top layer of mylar again with no magnetic particles. This type of card is not suitable for this system as the concentration of magnetic pigment in the central layer will make the card center nearly black, and the magnetic particles will be separated from the record head by more than 5 mils (0.005"). This amount of separation will cause significant signal loss. The new card proposed here will contain a very small concentration of magnetic particles throughout the entire volume, thus eliminating the signal loss associated with head to media separation. In addition, the card will be substantially white since the amount of magnetic pigment can be very low. At concentrations of less than $1/40^{th}$ of one percent by volume, there is still adequate signal to be sensed by the FGPMR head. This is demonstrated in FIG. 14 where the output signal from the head is shown.

Because the field levels from these cards are so low, only an MR head and more specifically a FGPMR head, as described above, will be able to sense the field levels at adequate signal to noise ratios to enable decoding the data previously recorded on the card. This provides an added security benefit to the systems. The new cards cannot be duplicated as previously discussed and they cannot be read by any standard inductive head card reader. This helps prevent theft of the data that is encoded on the card. Only the matching readers of this system will be able to decode the cards. The readers do have the added benefit of being able to read standard mag-stripe cards, but the new cards can only be read by our new readers. This means the user of the system can have extra security in that the cards cannot be copied or duplicated and the data cannot be decoded without special readers.

What is claimed is:

1. A credit and access control card and reader system comprising:

a magnetically encodable card comprising a body having upper and lower surfaces and side and end edges, said body being formed of plastic material having magnetic particles non-randomly, uniformly dispersed throughout the plastic material; and capable of magnetically recording data; and a reader having a magnetoresistive (MR) head for reading said magnetically encodable card as it is moved past said MR head.

2. The system of claim 1 wherein said MR head of said reader is a paired magnetoresistive (PMR) head.

3. The system of claim 2 wherein said PMR head includes a magnetic flux guide for conducting magnetic flux from a card read by said reader to said PMR head.

4. The system of claim 1 wherein said reader can also read a card having a magnetically encodable magnetic stripe of high magnetic particle concentration and wherein said magnetically encodable card have a low concentration of magnetic particles uniformly dispersed throughout the plastic material.

5. The system of claim 4 including circuitry for detecting encodable data selectively from either said card having a magnetically encodable magnetic stripe or said magnetically encodable card.

* * * * *